July 10, 1928.
A. S. PLOWMAN
1,676,413
FRUIT SEEDER
Filed Aug. 20, 1924 5 Sheets-Sheet 4
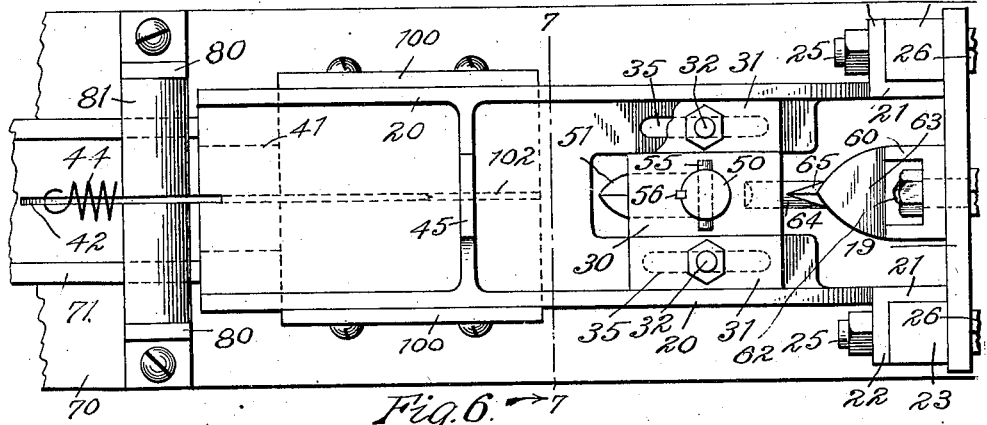
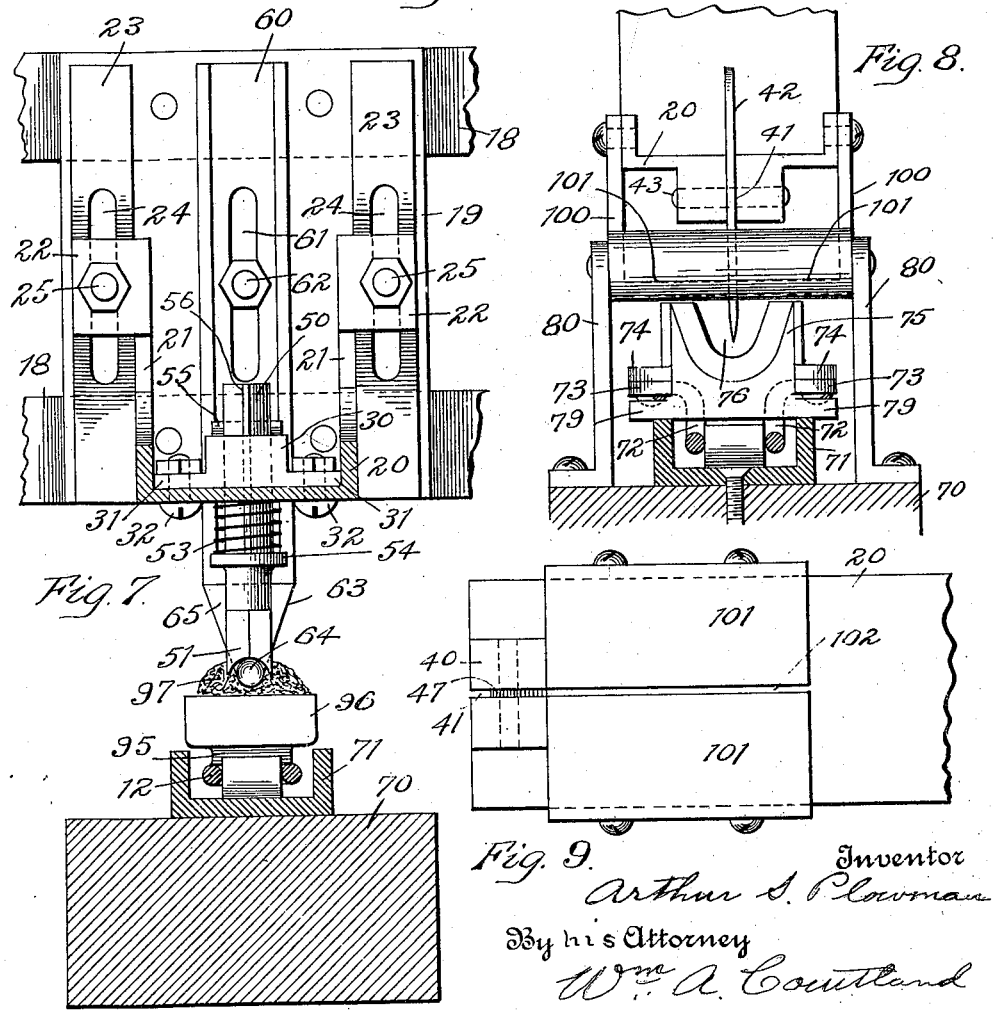
Inventor
Arthur S. Plowman
By his Attorney
Wm. A. Courtland July 10, 1928.
A. S. PLOWMAN
1,676,413
FRUIT SEEDER
Filed Aug. 20, 1924   5 Sheets-Sheet 5
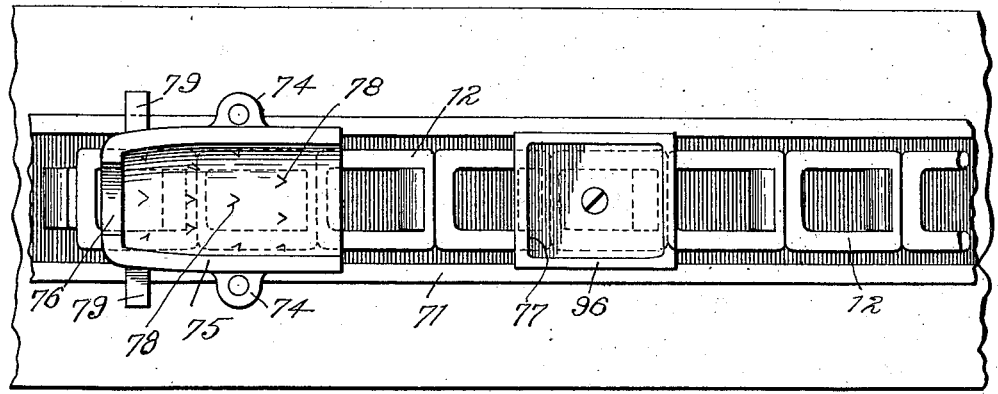
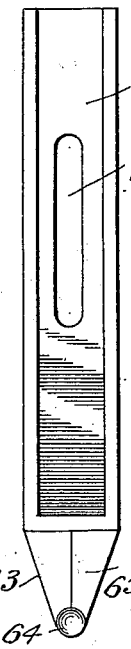
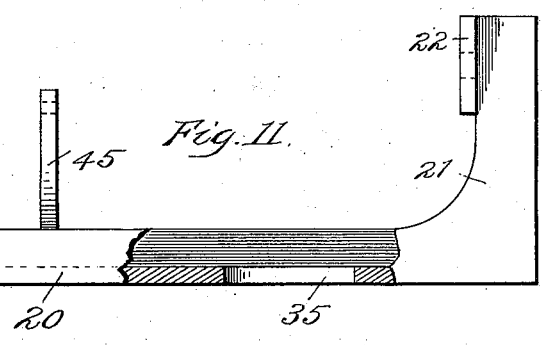
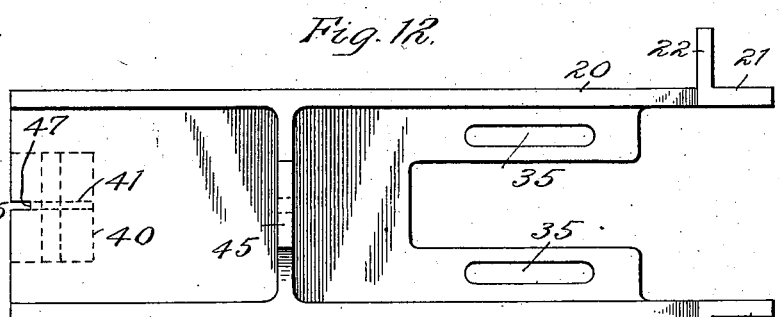
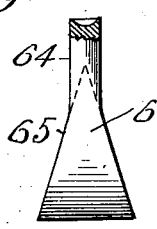
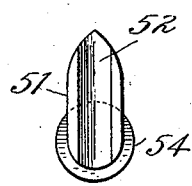
Inventor
Arthur S. Plowman
By his Attorney
Wm. A. Courtland Patented July 10, 1928.

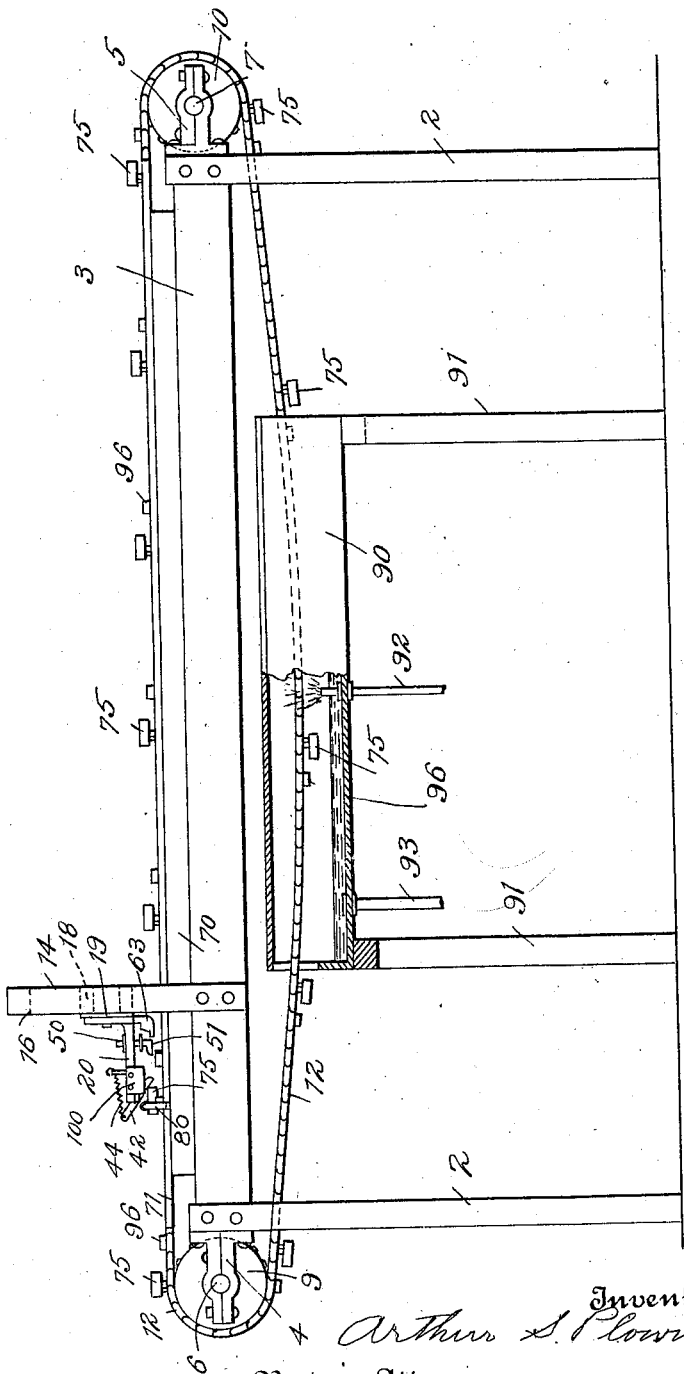

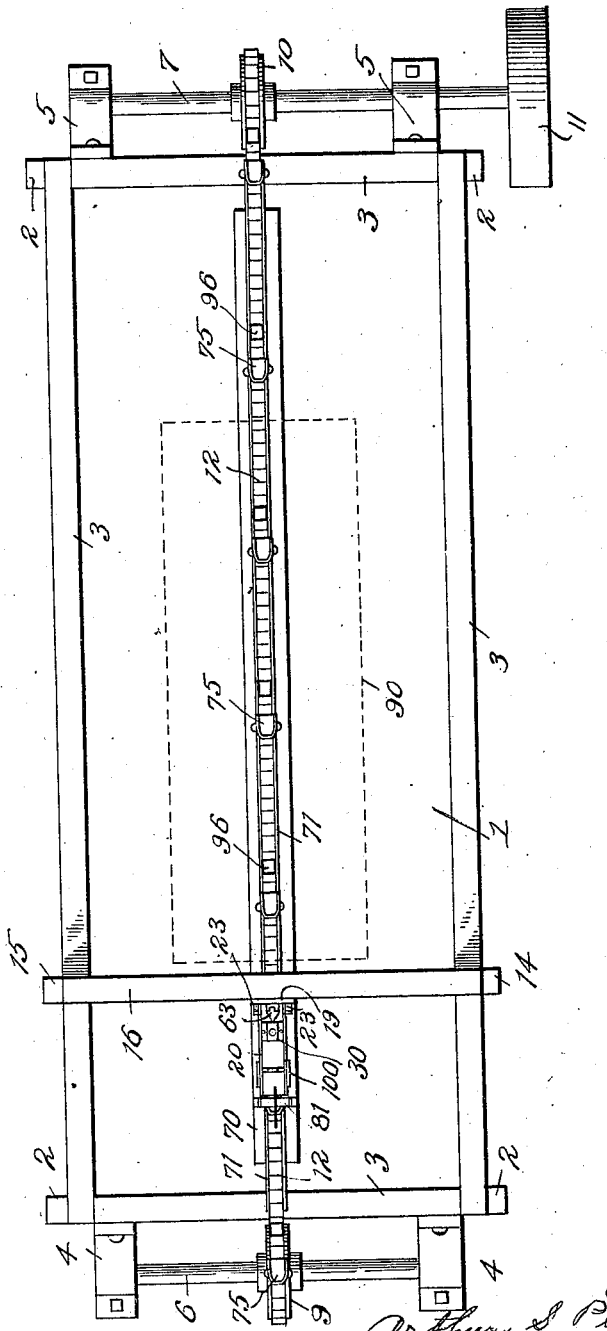

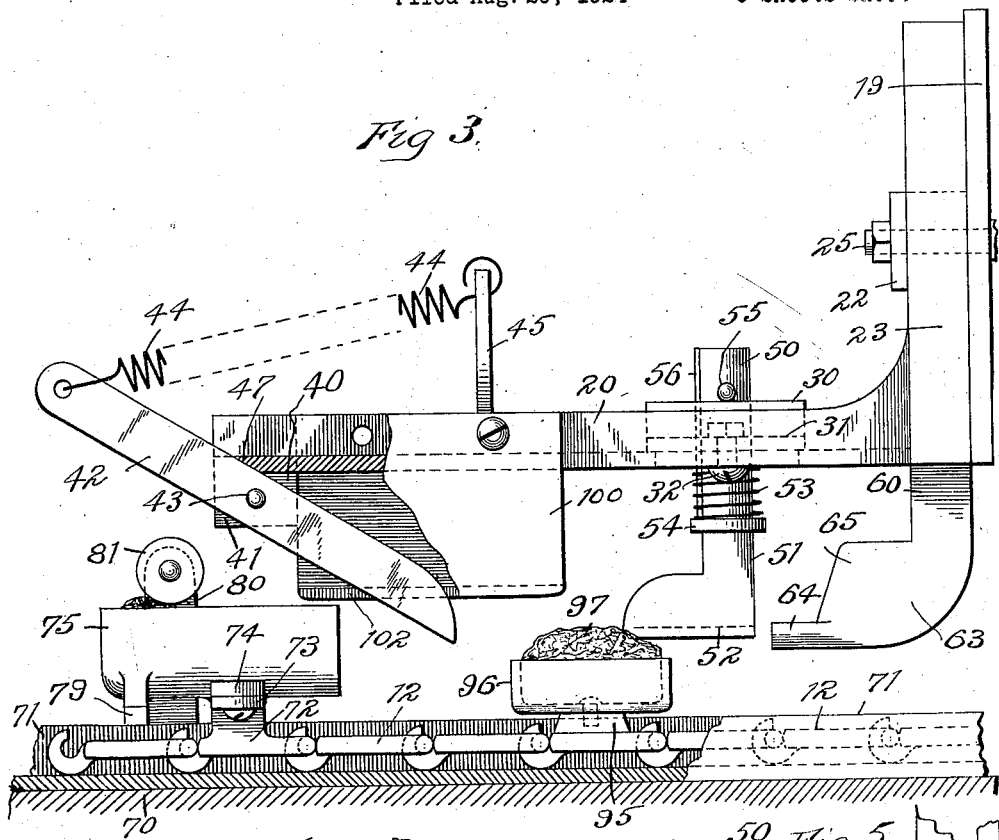

1,676,413

UNITED STATES PATENT OFFICE.

ARTHUR S. PLOWMAN, OF NEW YORK, N. Y., ASSIGNOR OF ONE-FIFTH TO SALVATORE A. DANNA, OF NEW YORK, N. Y.

FRUIT SEEDER.

Application filed August 20, 1924. Serial No. 733,076.

The present invention relates in general to machines for removing seeds from fruit and more particularly to a machine for removing seeds from fruit wherein the seed is of the elongated type.

The primary object of the invention is to provide a thoroughly reliable and efficient machine for automatically performing the operations necessary to remove seeds from fruit.

A feature of the invention consists in providing means for slitting fruit longitudinally and holding said fruit in longitudinal position while it is being slit.

Further features of the invention consist in providing means for holding the seed in longitudinal position while being ejected and means for ejecting the seed longitudinally from the fruit.

Further features of the invention consist in providing means for cleansing the fruit holding receptacles and moistening and cleansing the fruit slitting, seed holding and seed ejecting devices.

The machine is particularly designed to remove seeds from dates, prunes and all fruit wherein the seed is of elongated formation, and consists of means for slitting the fruit, means for holding the seed, means for ejecting the seed from the fruit and means for cleansing and moistening the several means to more readily permit them to properly perform their functions.

Other and further objects, including certain features of construction and operation will appear in the specification and be pointed out in the appended claims, reference being had to the accompanying drawings which show the preferred embodiment of the invention.

In the accompanying drawings:

Figure 1 is a side elevation of the machine embodying my invention.

Figure 2 is a plan view of the same.

Figure 3 is an enlarged elevation, partly in section, showing the relative positions of the parts at the beginning of a seed removing operation.

Figure 4 is a fragmentary view showing how the fruit is opened.

Figure 5 is a fragmentary view showing how the seed is ejected from the fruit.

Figure 6 is a plan view of Figure 3.

Figure 7 is a sectional detail in front elevation on the line 7—7, Figure 6.

Figure 8 is an end view of Figure 6.

Figure 9 is a fragmentary view of plates for holding the fruit in a receptacle while said fruit is being slit.

Figure 10 is a detail plan view of a fruit holding receptacle, the cup for holding the moistening means and the conveyer member for carrying said elements.

Figure 11 is a detail view in side elevation of the bracket for holding the knife and seed holding members.

Figure 12 is a plan view of the same.

Figure 13 is a detail in front elevation of the adjustable seed ejecting member.

Figure 14 is a bottom view of the same.

Figure 15 is a bottom detail view of the seed holding device.

In the preferred embodiment of my invention as shown in the accompanying drawings, 1 is the floor of the machine, 2 the legs and 3 the supporting frame, here shown as made of wood. Fastened on opposite ends of the frame by suitable journal brackets 4 and 5 are transverse shafts 6 and 7, each shaft having mounted thereon midway of the machine, sprocket wheels 9 and 10. These sprocket wheels are of standard construction and are driven by pulley 11, carrying thereon an endless link belt member 12 of any suitable make, preferably the kind permitting the insertion of links of special design for the purpose hereinafter set forth. Secured to the frame 3 adjacent the left or front end of the machine are uprights 14 and 15 the tops of which are attached to a cross member 16. Supported on uprights 14 and 15 on transverse bars 18 is a vertical plate 19 from which is suspended the means for slitting the fruit and holding and ejecting the seed from said fruit. To maintain these means in desired position I employ a bracket 20, preferably channeled in the manner shown in Figures 6, 7, 11 and 12. One end of this bracket is provided with upwardly extending vertical arms, the tops of which have ears 22 adapted to rest against vertical ribs 23, forming part of plate 19. To permit the bracket 20 to be adjusted vertically the ribs 23 and plate 19 are slotted, as shown at 24, Figure 7, and through these slots and the ears 22 of the bracket are bolts 25, each provided with a nut 26 adapted to engage the back of plate 19. Resting on the top and between the side walls of the bracket 20, is a block 30, reduced on its sides to form flanges 31 through which pass bolts 32 carrying nuts 33 for adjusting said block longitudinally on the bracket 20. To allow the block 30 to be adjusted on the bracket 20, said bracket is provided with slots 35 through which pass the bolts 32 carried by block 30.

Centrally located on the forward end of the bracket 20 is a block 40 having a vertical slot 41 into which is fitted and freely moves a knife 42, said knife being pivoted to the block 40 in the manner shown at 43. The upper end of this knife has attached thereto one end of a spring 44, the opposite end of said spring being attached to an arm 45 forming part of the bracket 20. This spring permits the knife to yieldingly engage the fruit to be slit but is of sufficient strength to slit said fruit to the depth of the seed. To prevent the spring from drawing the knife back too far, the top of the block 40 is cut away at an angle, as shown at 47, Figure 3, to form a stop for said knife.

The block 30 has a central vertical hole therethrough in which freely rides the shank 50 of the seed holding member 51. The lower end of this seed holding member is elongated horizontally to form a foot and is grooved on its under side, as shown at 52 Figure 15, to engage and hold a seed in longitudinal position while it is being ejected from the fruit. In order to have the seed holding member yieldingly engage a seed a spring 53 is placed on the shank 50 between the bottom of the bracket 30 and a collar 54 on said shank. This spring provides for any variation in the position of the seed while said seed is being ejected from the fruit. Passing through the shank 50 above block 30, is a pin 55 for limiting the downward movement of said seed holding member, while the alinement of said seed holding member is maintained by a spline 56 on the shank 50.

Attached to the plate 19 in vertical position and midway between ribs 23 on said plate, is a bar 60 having a vertical slot 61 adapted to receive a bolt 62 for adjusting said bar vertically on the plate 19. The lower end of this bar 60 has formed integral therewith a head 63 which extends forward in horizontal position and is employed to eject the seed from the fruit. The extreme forward portion of this head is rounded, as shown at 64, and the rear portion tapered rearwardly, as shown at 65 Figure 14. The forward end of the rounded portion of this head is made concave to receive the end of the seed and maintain said seed in proper position while it is being ejected from the fruit. It will be noticed by referring to Figure 5 that the seed ejector is adjacent the seed holding member and pushes the seed longitudinally forward through the fruit, while the seed holding member 51 retains the seed in longitudinal position. The object in tapering the head of the seed ejector is to provide means for opening the slit in the fruit to permit said fruit to be stuffed, when so desired.

In the center of the table and lengthwise of the machine is fastened a beam 70. Attached to the top of this beam in any suitable manner is a U-shaped strip of metal 71 through which the receptacle conveying chain 12 rides, and is held in alinement while passing over the top of the machine.

This chain carries a number of special shaped links 72 having ears 73 fastened to corresponding ears 74 formed integral with the fruit receptacles 75, as shown in Figures 3, 8 and 10. These receptacles are large enough to contain one date, prune or the like in longitudinal position while the seed is being ejected from the fruit. In order to permit the seed to pass freely from the fruit the forward ends of the receptacles are open, as shown at 76. By referring to Figures 4, 5 and 10 it will be noticed that the opening 76 in the receptacle is smaller than the width and depth of the receptacle, thereby allowing one end of the fruit to abut against the inner wall 77 of the receptacle and prevent said fruit from being dislodged while the seed is being ejected. To aid in holding the fruit in the receptacle while the seed is being ejected, I preferably notch the inner wall of each receptacle with small spurs 78, as noticed in Figure 10. On one end of each fruit receptacle is a transverse bar 79 which rides on the upturned edges of the U shaped metal strip 71 and aids in supporting said receptacle in horizontal position.

After the fruit is placed in a receptacle it is necessary to provide some means to compress said fruit firmly therein while it is undergoing the slitting and seed ejecting operations. This is accomplished by fastening two vertical standards 80 to the beam 70 in a manner to support a roller 81 in transverse position and directly over the fruit receptacles, as shown in Figures 3, 4 and 10. When a filled fruit receptacle passes under said roller 81 the fruit will be firmly compressed within the receptacle in the manner shown in Figures 4 and 5.

Owing to the amount of sugar present in dates, prunes and the like, it is essential that some means be employed to keep the several parts engaging the fruit clean in order to have said parts properly perform their functions. Beneath the table of the machine is a tank 90 suitably supported on legs 91 and supplied respectively with inlet and outlet water pipes 92 and 93. The chain 12, which carries the receptacles, passes through the tank and each receptacle is cleansed as it passes over a strong jet of water thrown out by the inlet pipe 92.

It is advisible that the slitting knife, seed holding member and seed ejecting member be moistened after each operation, in order to permit them to more easily perform their functions. The chain 12 is therefore provided with a number of special shaped links 95 to which are fastened cups 96, see Figures 3 and 10. These cups contain any suitable moistening material 97, such as sponge, rubber or the like, and directly engage the slitting knife, seed holding member and seed ejecting member, all of which are disposed within the path of said moving cups. These cups are attached to the chain 12 just forward of the fruit receptacles 75 and moisten said slitting knife, seed holding member and seed ejecting member immediately before they engage the fruit to perform their functions.

When the slitting knife 42 enters the fruit in a receptacle it has a tendency to lift or dislodge said fruit while it is being slit. To overcome this objectionable feature I provide two right angle plates 100 which are fastened to the bracket 20 and project downward from said bracket and then inward over the receptacle, as shown at 101. These plates do not meet in the center but remain apart a sufficient distance to allow the slitting knife to move freely between them in the opening 102, Figure 3. The transverse portions of these plates are just above the top surface of the receptacle and hold the fruit while it is being slit. By referring to Figure 4 it will be noticed that the slitting knife only enters the fruit far enough to slit said fruit from end to end and to the depth of the seed.

It should be noticed that the compressing roller, slitting knife, seed holding member, seed ejecting member and cleansing tank are all fixed elements disposed within the path of the chain carrying the fruit holding receptacles and moistening cups.

The operation of the machine is as follows:

Chain 12 having been set in motion, the fruit is placed in the receptacles at the forward end of the machine, manually or otherwise, and carried under the compressing roller where said fruit is firmly lodged within the receptacles. Separately the filled receptacles pass under the slitting knife and slit to the depth of the seed. The seed holding member then enters the slit in the fruit and engages the seed to hold it in longitudinal position. After the seed holder has passed into the fruit a sufficient distance to insure the holding of the seed, the end 64 of the seed ejecting member enters the slit in the fruit and engages the end of a seed pushing said seed towards the opening in the end of the receptacle, as shown in Figure 5. As the seed is forced from the fruit the tapered head 65 of the seed ejecting member widens the slit in the fruit for the purpose explained. After the fruit is slit and the seed ejected the receptacles carry said fruit to the rear of the machine where it is removed from the receptacles, manually or otherwise.

While I have shown and described the preferred embodiment of my invention, obviously modifications may be made within the spirit of the appended claims.

I claim:

1. In a machine of the character described, the combination of an endless travelling member, a plurality of receptacles carried by said travelling member, means for slitting the fruit, means for ejecting the seed, means for engaging and guiding the seed, and a plurality of moistening devices carried by the travelling member adapted to engage and moisten the fruit slitting, seed guiding and seed ejecting means.

2. In a machine of the character described, a travelling member, individual fruit holding receptacles carried by said travelling member, means for slitting the fruit, means for guiding the seed, means for ejecting the seed, and a plurality of cups containing a moistening material for engaging the slitting means, the seed guiding means and the seed ejecting means.

ARTHUR S. PLOWMAN.